United States Patent [19]

Cirillo

[11] Patent Number: 4,570,851
[45] Date of Patent: Feb. 18, 1986

[54] TEMPERATURE REGULATING, PRESSURE RELIEF FLOW VALVES EMPLOYING SHAPED MEMORY ALLOYS

[76] Inventor: John R. Cirillo, 226 Kohr Rd., Kings Park, N.Y. 11754

[21] Appl. No.: 607,629

[22] Filed: May 7, 1984

[51] Int. Cl.[4] ............................................. G05D 23/02
[52] U.S. Cl. ................................. 236/93 R; 236/101 R
[58] Field of Search ................ 236/92 C, 93 R, 101 R

[56] References Cited

U.S. PATENT DOCUMENTS

| | | | |
|---|---|---|---|
| 1,927,036 | 9/1933 | Johnson | 236/92 C X |
| 2,099,643 | 11/1937 | Werring | 236/92 C |
| 2,868,460 | 1/1959 | Hansen et al. | 236/92 C |
| 3,174,851 | 3/1965 | Buehler et al. | 75/170 |
| 3,351,463 | 11/1967 | Rozner et al. | 75/170 |
| 3,352,650 | 11/1967 | Goldstein et al. | 29/191 |
| 3,352,722 | 11/1967 | Wang et al. | 148/1.6 |
| 3,366,128 | 1/1968 | Feinberg | 236/92 C X |
| 3,391,882 | 7/1968 | Johnson et al. | 244/1 |
| 3,403,238 | 9/1968 | Buehler et al. | 337/393 |
| 3,416,342 | 12/1968 | Goldstein et al. | 72/47 |
| 4,078,722 | 3/1978 | Luckenbill | 236/92 C |
| 4,227,646 | 10/1980 | Hart et al. | 236/93 R |

OTHER PUBLICATIONS

Shaped Memory Alloys by L. McDonald Scherky.
The Engineering/Design Properties of NITINOL the Metal with a Memory Battelle Memorial Institute-Columbus Laboratories, Jun. 25, 1969.

Primary Examiner—William E. Tapolcai
Attorney, Agent, or Firm—Stanley Ira Laughlin

[57] ABSTRACT

The invention relates to a temperature regulating/pressure relief valve employing a shaped memory alloy wire positioned under tension within the housing of the valve. The wire contracts upon an increase in temperature in the fluid passing through the valve thereby initially either closing or opening the valve, and subsequently loading a spring which maintains the valve closed or opened under a predetermined pressure.

7 Claims, 8 Drawing Figures

TEMPERATURE REGULATING, PRESSURE RELIEF FLOW VALVES EMPLOYING SHAPED MEMORY ALLOYS

BACKGROUND OF THE INVENTION

The invention generally relates to fluid valves for coolingheating systems in marine, aircraft and automobiles and in particular to temperature pressure fluid valves such as found in Classes 137, 222, 236, and 251.

Temperature, pressure valves employing bimetalic elements and phase and vapor change diaphragms in conjunction with compression springs and mechanical members are so well known that they are described in many service manuals and other similar publications.

Shaped memory alloys of nickel and titanium were discoved in 1962 and are described in U.S. Pat. Nos. 3,174,851, 3,351,463, 3,352,650, 3,352,722, 3,391,882, 3,403,238 and 3,416,342.

It is an object of applicant's invention to provide a safe, reliable and simple temperature, pressure valve for service in the marine, aeronautical and automotive disciplines.

It is a further object of applicant's invention to provide a maintenance free economical temperature, pressure valve.

SUMMARY OF THE INVENTION

Applicant's invention relates to a temperature regulating, pressure relief valve employing a shaped memory alloy wire that is held in tension and which contracts upon slight increases in temperature of the fluid passing through the valve resulting in either opening or closing the valve and compressing a spring mechanism. When either the temperature of the fluid decreases or pressure of the fluid increases beyond the pressure exerted by the spring, the valve reopens or recloses.

DETAILED DESCRIPTION OF THE INVENTION

Figure 1:
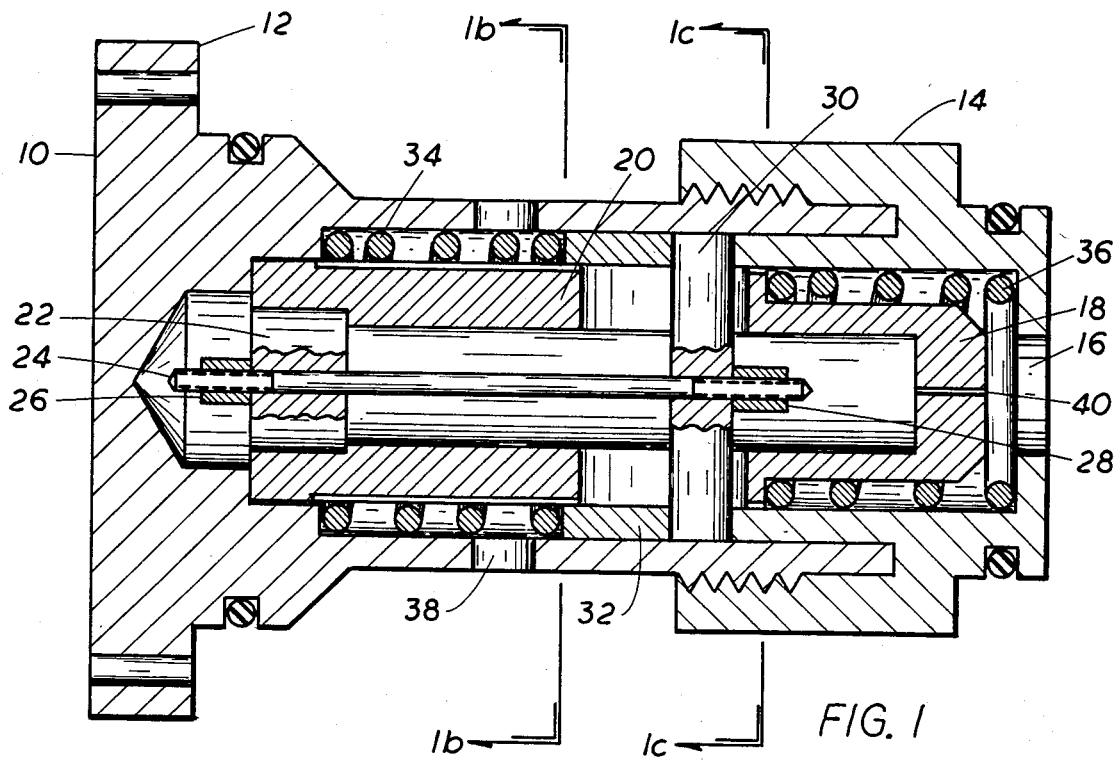
FIG. 1 shows a side cross-sectional view of applicant's inventive temperature regulating pressure relief valve in the normally open position when cooler fluid is passing through the valve.

FIG. 1 shows applicant's inventive temperature regulating pressure relief valve 10 in its normally open position during the flow of a fluid through the valve at cold or normal temperatures normally employed in blocks and headers. The valve essentially comprising a rear housing 12, and a front housing 14 in which the rear housing is screwed into the front housing having a port 16 for introducing the fluid into the valve. O ring seals encircle the exterior of the rear and front housings to prevent undesired leakage of the fluid passing through the valve. A valve seat 18 for stopping the flow of fluid through entrance port 16 is part of a cylindrical spool 20 that is capable of movement and extends through the interior of the front and rear housing, said spool 20 being forced rearward by return spring 36 and being affixed to a stop 22 at its end opposite to said valve seat 18. A shaped memory alloy wire 24 such as NITINOL, a registered trademark, is held in tension in the center of the valve by a rear retention ferrule 26 behind stop 22 permanently swaged to the rear end of the shaped memory wire, and a front retention ferrule 28 behind a cross-pin 30 backed against said front housing and capable of rearward movement within the interiors of said front and rear housing. The cross-pin 30 is locked into an outer cylindrical sleeve 32, which is pushed against the front housing by a pressure relief overtravel spring 34 which has a higher preload than spool return spring 36. The valve is normally open during the flow of a fluid through the valve at cold or normal temperatures; the fluid leaving the valve through exit ports 38.

Figure 2:
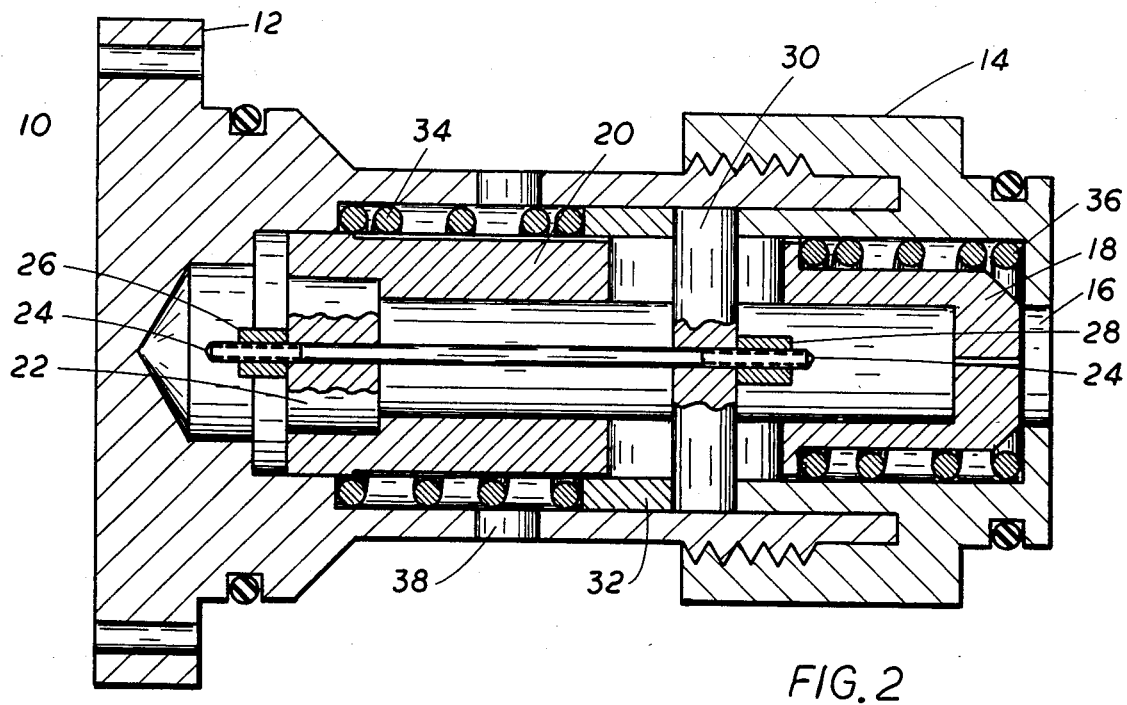
FIG. 2 shows the side cross-sectional view shown in FIG. 1 in the closed position when the temperature of the fluid passing through the valve has increased.
Figure 3:
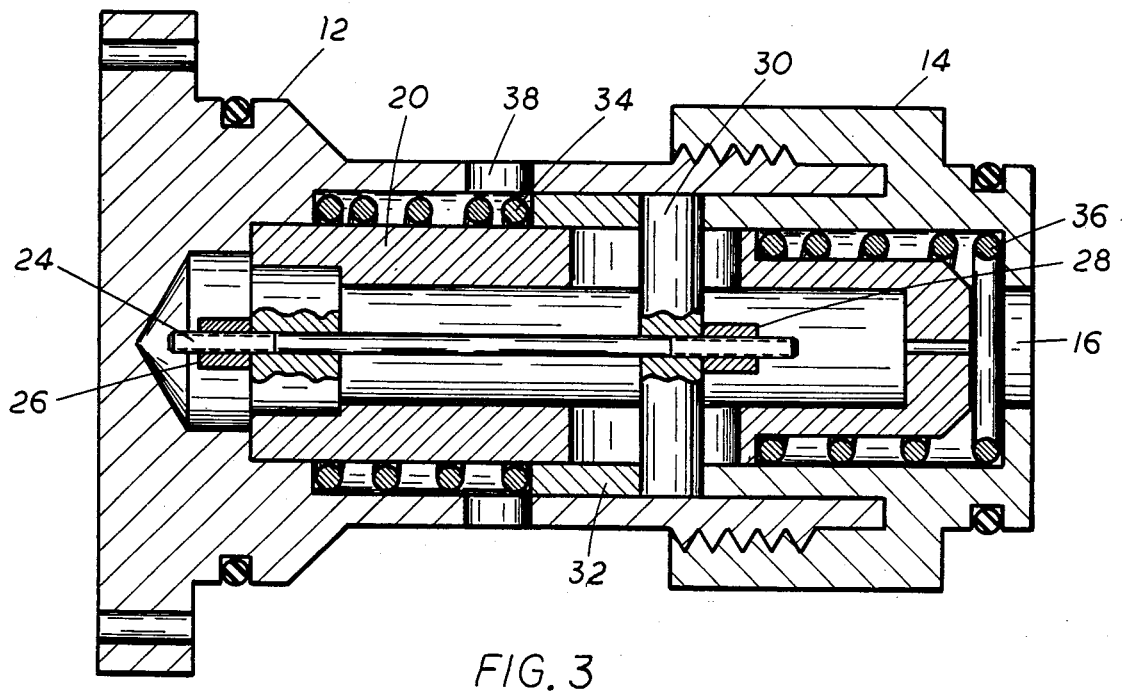
FIG. 3 shows the side cross-sectional view shown in FIG. 1 in the opened position when both the temperature and pressure of the fluid passing through the valve have increased.

The operation of the valve when the temperature of the fluid rises over a small temperature change, is caused by the contraction of the shaped memory alloy wire 24, which in turn causes stop 22 to move towards the front housing and causes the valve seat 18 to move and seal entrance port 16 as shown in FIG. 2. After the valve seat 18 is seated to block entrance port 16, further contraction of the shaped memory alloy wire 24 pulls cross-pin 30 rearward, which in turn further forces outer sleeve 32 against pressure relief/overtravel spring 34 resulting in a set load pushing valve seat 18 against entrance port 16 without placing excessive distortion upon the shaped memory alloy wire 24 even when the valve seat is substantially worn because of continuous service. Upon pressure increase at entrance port 16 sufficient to overcome the pressure differential between the higher pressure relief/overtravel spring 34 and spool return spring 36, the valve seat 18 will travel rearward, thereby opening the valve while the temperature of the fluid is high as shown in FIG. 3.

Figure 4:
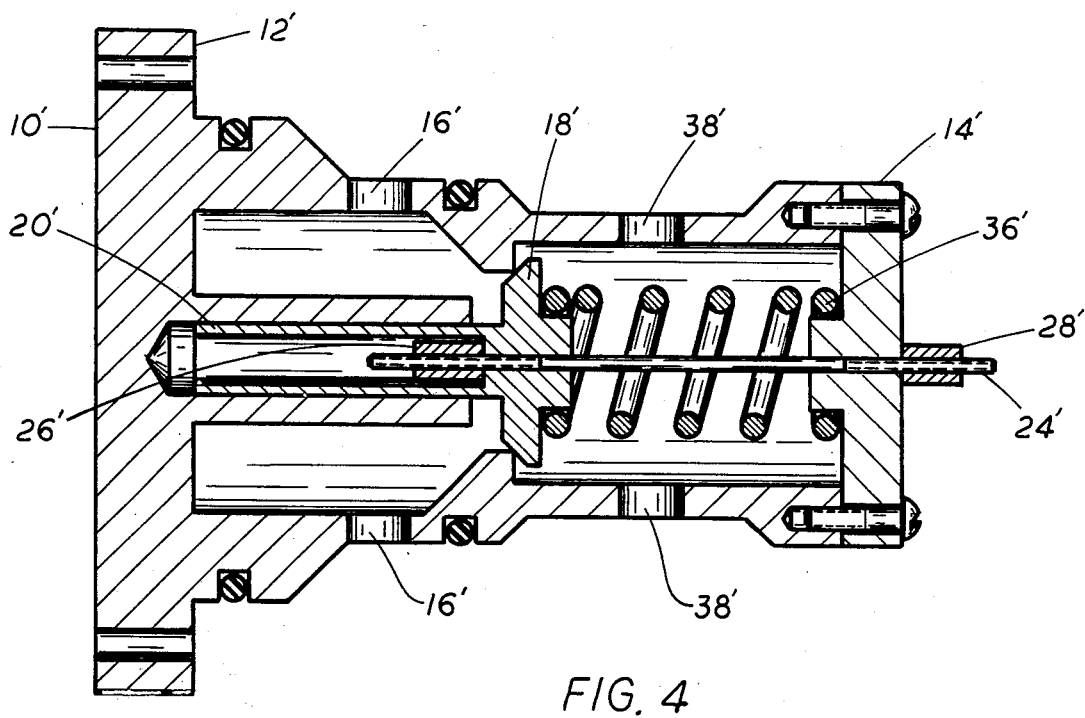
FIG. 4 shows a side cross-sectional view of another embodiment of applicant's inventive temperature regulating pressure relief valve in the normally closed position when cooler fluid is passing through the valve.

FIG. 4 shows another embodiment of applicant's inventive temperature regulating, pressure relief valve 10' wherein the valve is normally closed during the flow of a fluid at cooler or normal temperatures. This embodiment of the applicant's valve comprises a rear housing 12' having entrance ports 16' and a front housing 14' which is fastened without leaking to rear housing 12' by conventional means such as washers (not shown) and machine screws. O rings encircle the exterior of the rear housing 12' to prevent leakage of the fluid passing through the valve and exiting through ports 38'. A valve seat 18' for stopping the flow of fluid through entrance port 16' is part of the cylindrical spool 20' which extends through the interior of rear housing 12'; said spool 20' being capable of rearward movement through return spring 36' affixed to front housing 14' opposite to valve seat 18'. A shaped memory alloy wire 24' such as NITINOL, a registered trademark, is held in tension in the center of the valve by rear retention ferrule 26' behind spool 20' permanently swaged to the rear end of the shaped memory alloy wire and a front retention ferrule 28' behind the exterior of front housing 14'. It is noted that although only a single shaped memory alloy wire has been shown in the drawings of this application, there is no reason why a plurality of shaped memory alloy wires could not be employed in any of the applicant's embodiments. The temperature regulating, pressure relief valve shown in FIG. 4 is normally closed during the flow of cooler or normal temperature fluid through the valve.

Figure 5:
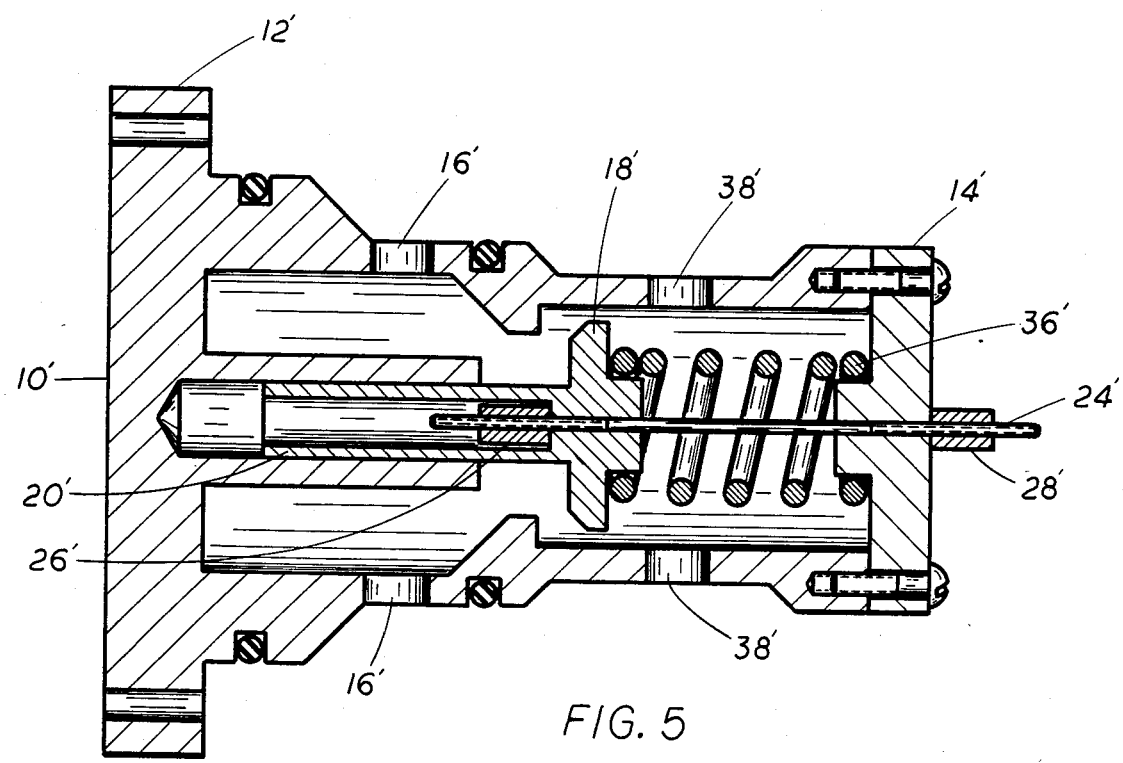
FIG. 5 is the side cross-sectional view of the embodiment shown in FIG. 4 of applicant's inventive temperature regulating pressure relief valve in its open position when the temperature of the fluid passing through the valve has increased.

The operation of the valve when the temperature of the fluid rises because of small temperature changes in the fluid results from the contraction of the shaped memory alloy wire 24', which in turn causes spool 20' to move towards the front housing 14', thereby opening valve seat 18' and allowing the fluid to flow out through exit ports 38' as shown in FIG. 5. Upon temperature decreases of the fluid, the shaped memory alloy wire 24' relaxes and the valve seat 18' is closed by return spring 36'.

Figure 6:
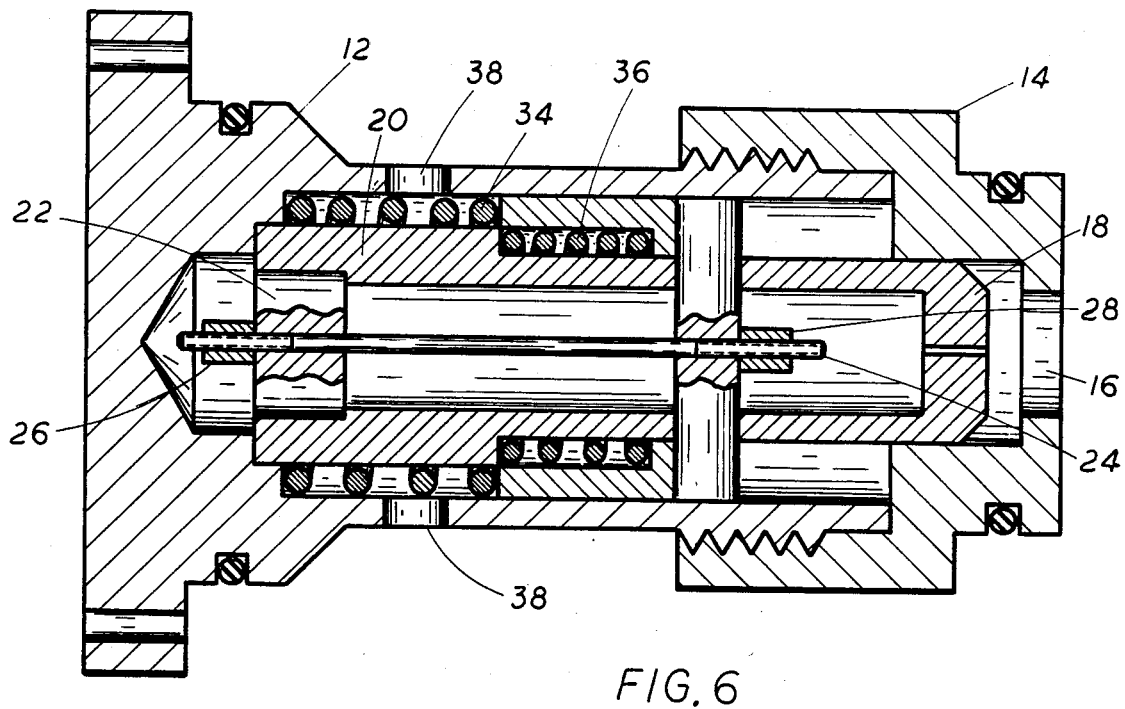
FIG. 6 shows a side cross-sectional view of yet another embodiment of applicant's inventive temperature regulating pressure relief valve in the normally open position when cooler fluid is passing through the valve.

FIG. 6 shows yet another embodiment of applicant's inventive valve employing the same invention but in which the pressure relief/overtravel spring 34 and spool return spring 36 are on the same side of the cross-pin. It is noted, although not shown, that the valves may employ any number of exit ports within the housing.

Figure 1B:
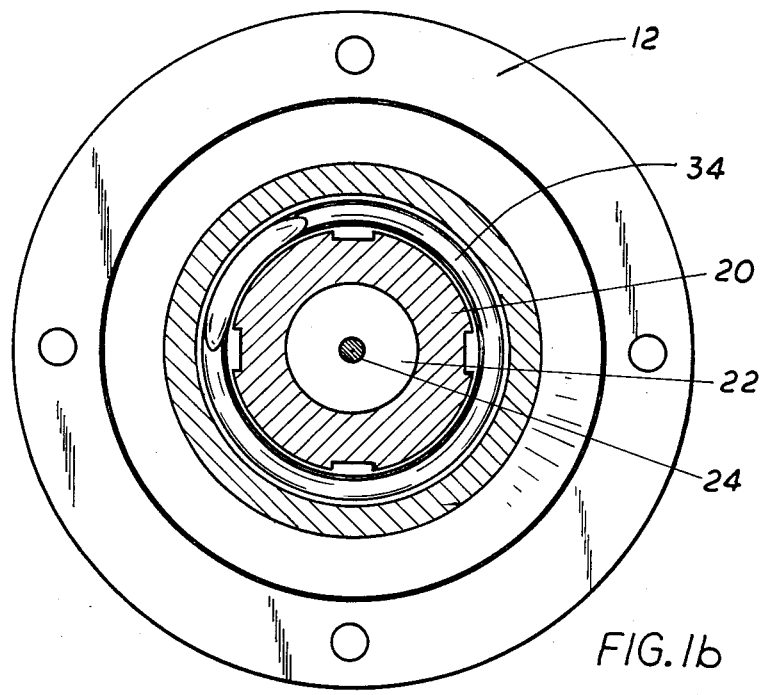
FIG. 1b is a front cross sectional view of the valve shown in FIG. 1 as indicated by the arrows 1b.
Figure 1C:
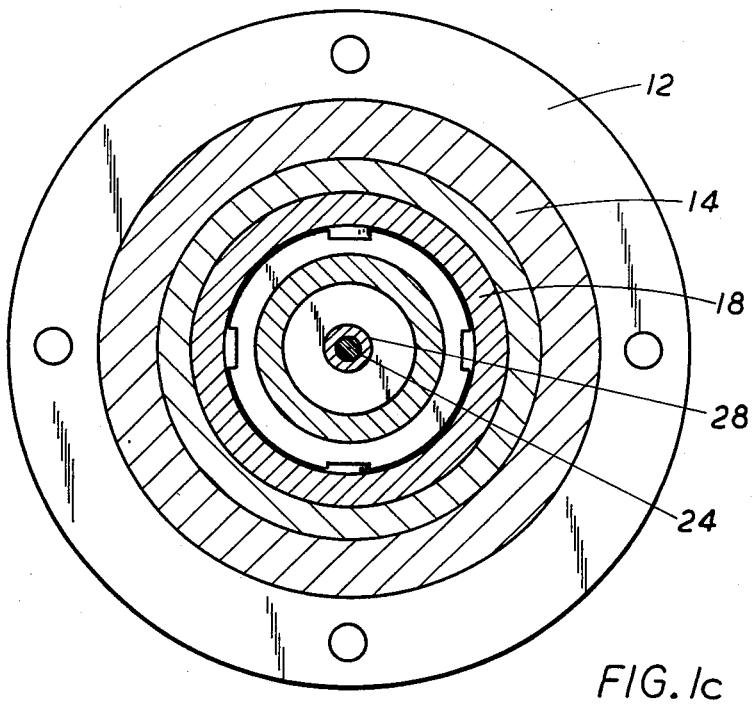
FIG. 1c is a front cross sectional view of the valve shown in FIG. 1 as indicated by the arrows 1c.

There is shown in Applicant's inventive valve the use of apertures, such as aperature 40 in the entrance port shown in FIG. 1 or cutaway sections through the spool 20 as shown in FIGS. 1b and 1c for the use of so called "bleed through holes" to enable the seepage of small amounts of fluid for uses such as deicers if the fluid was a hot gas and also permitting flow between inlet 16 and outlet 38 respectively.

It is expected that although only a limited number of embodiments are shown, applicant's invention should not be so limited; being only limited by the breadth and scope of the annexed claims.

I claim:

1. A temperature regulating, pressure relief valve comprising a hollow interior housing, normally opened entrance and exits ports within said housing for allowing fluids to flow through the interior of said housing, a closure device for said entrance port, an assembly for sliding movement within the interior of said housing affixed to said entrance port closure device, mechanical springs for movement of said sliding assembly, a shaped memory alloy wire assembly comprising wires held in tension within said sliding assembly, said shaped memory alloy wires contracting upon temperature increases of said fluids and thereby causing sliding movement in one direction of said assembly and said closure device resulting in the closing of said entrance port and the compressing of said mechanical springs for maintaining pressure upon said entrance port closure device, and said shaped memory alloy wires relaxing upon temperature decreases of said fluids and thereby resulting in sliding movement in an opposite direction of said assembly and said closure device resulting in the opening of said entrance port and the opposite compressing of said mechanical springs for maintaining pressure against closing said entrance port.

2. A temperature regulating pressure relief valve as claimed in claim 1 wherein said closure device for said entrance port comprises an aperture for permitting a small predetermined quantity of fluid to flow through the valve whether the valve is opened or closed.

3. A temperature regulating pressure relief valve as claimed in claim 1 wherein said shaped memory alloy wire assembly comprises a plurality of shaped memory alloy wires.

4. A temperature regulating pressure relief valve as claimed in claim 1 wherein said shaped memory alloy wire assembly comprises a single shaped memory alloy wire.

5. A temperature regulating pressure relief valve comprising a hollow interior housing, normally closed entrance ports and normally opened exit ports within said housing for controlling fluids through said valve, a closure device for said entrance port, an assembly for sliding movement within the interior of said housing affixed to said entrance port closure device, mechanical springs for movement of said sliding assembly, a shaped memory alloy wire assembly comprising one or more shaped memory alloy wires held in tension between said sliding assembly and said housing, said shaped memory alloy wires contracting upon temperature increases of said fluids passing through said valve and thereby causing sliding movement of said sliding assembly and said entrance port closure device in a direction to open said entrance port and compress said mechanical springs for maintaining pressure upon said entrance port closure device, and said said shaped memory alloy wires relaxing upon temperature decreases of said fluid flowing through said valve and thereby resulting in the sliding movement in an opposite direction of said assembly and said entrance port closure device thereby closing said entrance port.

6. A temperature regulating pressure relief valve as claimed in claim 5 wherein said entrance port closure device comprises a aperture for permitting the flow of relatively small quantities of fluid passing through said valve to pass through said valve whether said entrance port is opened or closed.

7. A temperature regulating pressure relief valve as claimed in claim 5 wherein said hollow interior housing comprises a unified section.

* * * * *